United States Patent
Droste et al.

(10) Patent No.: US 11,558,839 B2
(45) Date of Patent: Jan. 17, 2023

(54) DETERMINATION OF LOCAL TIME AT VEHICLE IGNITION

(71) Applicant: GM GLOBAL TECHNOLOGY OPERATIONS LLC, Detroit, MI (US)

(72) Inventors: Scott T. Droste, West Bloomfield, MI (US); Mohammadreza Aminikashani, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 544 days.

(21) Appl. No.: 16/688,616

(22) Filed: Nov. 19, 2019

(65) Prior Publication Data

US 2021/0153154 A1    May 20, 2021

(51) Int. Cl.
| | |
|---|---|
| *H04W 76/14* | (2018.01) |
| *H04W 56/00* | (2009.01) |
| *H04W 4/40* | (2018.01) |
| *G06F 1/14* | (2006.01) |

(52) U.S. Cl.
CPC .......... *H04W 56/0025* (2013.01); *G06F 1/14* (2013.01); *H04W 4/40* (2018.02); *H04W 76/14* (2018.02)

(58) Field of Classification Search
CPC ....... H04W 4/021; H04W 4/40; H04W 24/02; H04W 52/0206; H04W 56/002; H04W 56/0025; H04W 64/003; H04W 76/14

USPC ................................. 370/311, 329, 331, 338
See application file for complete search history.

(56) References Cited

U.S. PATENT DOCUMENTS

| | | | | |
|---|---|---|---|---|
| 2009/0271110 | A1* | 10/2009 | Sugiura | G04R 20/06 701/532 |
| 2014/0066064 | A1* | 3/2014 | Huang | H04W 4/021 455/456.3 |
| 2016/0119866 | A1* | 4/2016 | Miyagi | H04W 52/0206 370/311 |
| 2019/0215791 | A1* | 7/2019 | Stamatakis | H04W 56/002 |
| 2020/0084738 | A1* | 3/2020 | Nguyen | H04W 56/002 |

* cited by examiner

*Primary Examiner* — Harun Chowdhury
(74) *Attorney, Agent, or Firm* — Cantor Colburn LLP

(57) ABSTRACT

A system for updating vehicle time information includes a communication device configured to wirelessly communicate with a wireless network using a network communication protocol. The system also includes a processing unit configured to assess communications between the vehicle to determine whether a condition related to a potential local time offset error exists, and based on determining that the condition exists, transmit a message supported by the communication protocol to the wireless network. The message is configured to prompt the wireless network to return a response message including a local time offset. The process is also configured to update a vehicle local time record based on the local time offset.

18 Claims, 5 Drawing Sheets

DETERMINATION OF LOCAL TIME AT VEHICLE IGNITION

INTRODUCTION

The subject disclosure relates to a system and method of updating local time in a vehicle system, and in particular, to a system and method for causing a wireless network to timely provide local time information to a vehicle system.

Vehicles include various electronic devices such as processing systems and electronic control units (ECUs), which run software in order to operate various elements of the vehicle. Increasingly, vehicles are connected via telematics units or other devices to wireless networks for various purposes such as navigation, customer support, vehicle monitoring, traffic monitoring and fleet management. Such networks communicate periodically with the vehicle to, for example, monitor vehicle location and operation, and to provide local time information. After a time change (e.g., due to daylight savings time or entry into a different time zone), there can be instances where a wireless network fails to promptly inform the vehicle of the change, which can result in the vehicle recording and displaying the incorrect time. Accordingly, it is desirable to provide a method for acquiring timely updates of vehicle local time information from a wireless network.

SUMMARY

In one exemplary embodiment, a system for updating vehicle time information includes a communication device configured to wirelessly communicate with a wireless network using a network communication protocol. The system also includes a processing unit configured to assess communications between the vehicle to determine whether a condition related to a potential local time offset error exists, and based on determining that the condition exists, transmit a message supported by the communication protocol to the wireless network. The message is configured to prompt the wireless network to return a response message including a local time offset. The process is also configured to update a vehicle local time record based on the local time offset.

In addition to one or more of the features described herein, the wireless communication network is a wireless broadband network.

In addition to one or more of the features described herein, the processing unit is configured to assess the communications based on a change of a vehicle state.

In addition to one or more of the features described herein, the change in the vehicle state includes a change from an ignition OFF state to an ignition ON state.

In addition to one or more of the features described herein, the change in the vehicle state includes a transition between a first time zone and a second time zone.

In addition to one or more of the features described herein, the condition includes a daylight savings time (DST) local time change occurring subsequent to a previous time update received by the communication device from the wireless network.

In addition to one or more of the features described herein, the message includes a request to change a parameter associated with the communication device as defined by the communication protocol.

In addition to one or more of the features described herein, the wireless network is a Long Term Evolution (LTE) network, and the parameter is a discontinuous reception cycle (DRX) period.

In addition to one or more of the features described herein, the communication device is a telematics unit disposed in the vehicle.

In one exemplary embodiment, a method of updating vehicle time information includes assessing communications between a communication device in the vehicle and a wireless network using a network communication protocol. The assessing includes determining whether a condition related to a potential local time offset error exists. The method also includes, based on determining that the condition exists, transmitting a message supported by the communication protocol to the wireless network, the message configured to prompt the wireless network to return a response message including a local time offset, and updating a vehicle local time record based on the local time offset.

In addition to one or more of the features described herein, the wireless communication network is a wireless broadband network.

In addition to one or more of the features described herein, the assessing is performed based on a change of a vehicle state.

In addition to one or more of the features described herein, the condition includes a daylight savings time (DST) local time change occurring subsequent to a previous time update received by the communication device from the wireless network.

In addition to one or more of the features described herein, the message includes a request to change a parameter associated with the communication device as defined by the communication protocol.

In addition to one or more of the features described herein, the wireless network is a Long Term Evolution (LTE) network, and the parameter is a discontinuous reception cycle (DRX) period.

In addition to one or more of the features described herein, the communication device is a telematics unit disposed in the vehicle.

In one exemplary embodiment, a vehicle system includes a memory having computer readable instructions, and a processing device for executing the computer readable instructions. The computer readable instructions control the processing device to cause the processing device to assess communications between a communication device in the vehicle and a wireless network using a network communication protocol. The assessing includes determining whether a condition related to a potential local time offset error exists. The computer readable instructions also cause the processing device to, based on determining that the condition exists, transmit a message supported by the communication protocol to the wireless network, the message configured to prompt the wireless network to return a response message including a local time offset, and update a vehicle local time record based on the local time offset.

In addition to one or more of the features described herein, the assessing is performed based on a change of a vehicle state, the change in the vehicle state including a change from an ignition OFF state to an ignition ON state.

In addition to one or more of the features described herein, the condition includes a daylight savings time (DST) local time change occurring subsequent to a previous time update received by the communication device from the wireless network.

In addition to one or more of the features described herein, the wireless network is a Long Term Evolution (LTE) network, the message includes a request to change a parameter associated with the communication device as defined by a LTE protocol.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear by way of example only, in the following detailed description, the detailed description referring to the drawings in which.

DETAILED DESCRIPTION

Figure 1:
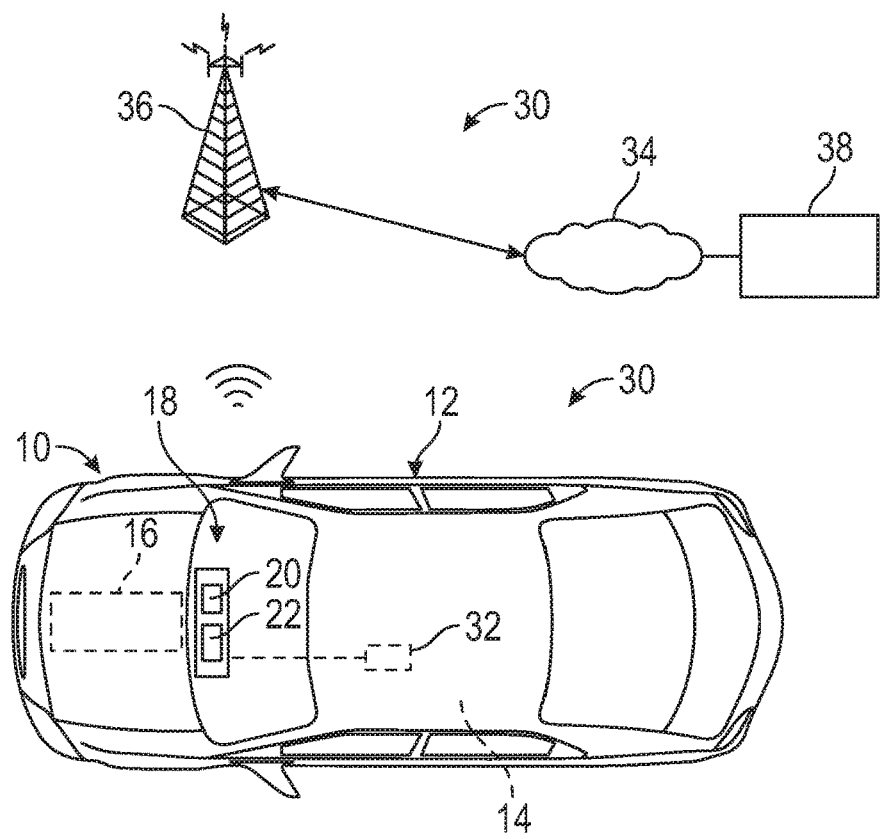
FIG. 1 is a top view of a motor vehicle including a vehicle processing device, in accordance with an exemplary embodiment.

The following description is merely exemplary in nature and is not intended to limit the present disclosure, its application, or uses. It should be understood that throughout the drawings, corresponding reference numerals indicate like or corresponding parts and features.

Devices, systems and methods are provided for communication between a vehicle and a wireless network, and for acquiring updated local time information associated with a location or region of the vehicle. An embodiment of a method includes determining, based on a vehicle being in a given operating state or transitioning into the given state, whether a condition exists that is related to a potential error in the local time maintained in the vehicle. An error in the local time record results in the time displayed by the vehicle to be incorrect.

In one embodiment, the method includes determining whether the condition exists based on the vehicle transitioning from an ignition OFF to an ignition ON state. The condition may be a circumstance in which a daylight savings time change occurred while the vehicle was idle and prior to the last time update broadcast from the network.

Based on determining that the condition exists, a vehicle processing device inspects current time information stored by the vehicle to determine whether the stored time information is consistent with the time change. If not, the processing device performs a change in a parameter defined by a communication protocol utilized by the wireless network and the vehicle.

The processing device transmits a message to the wireless network indicative of the parameter change. The message is configured according to the communication protocol to cause the network to return a message with local time information (e.g., a local time offset).

Embodiments described herein present numerous advantages and technical effects. For example, the methods described herein provide a way to acquire prompt time change information from a wireless network, under conditions where local time information may be in error due to network and device configuration.

The methods provide a device or unit-based solution that utilizes existing network communication protocols to force the network to provide updated local time offset information.

The embodiments allow for an update of a vehicle clock (e.g., radio clock) following daylight savings time event, at an ignition ON event, and overcomes a cellular network limitation that prevents timely delivery of local time information. This limitation is overcome without requiring a network-based solution. The embodiments eliminate the need for providing infotainment systems with a map and calendar to adjust time at daylight savings time events, and eliminate the need to update maps and calendars following local/regional changes in daylight savings time event scheduling.

FIG. 1 shows an embodiment of a motor vehicle 10, which includes a vehicle body 12 defining, at least in part, an occupant compartment 14. The vehicle body 12 also supports various vehicle subsystems including an engine assembly 16 (including a combustion engine and/or electric motor), and other subsystems to support functions of the engine assembly 16 and other vehicle components, such as a braking subsystem, a steering subsystem, a fuel injection subsystem, an exhaust subsystem, and others.

The vehicle 10 also includes an on-board computer system 18 that includes one or more processing devices 20 (e.g., one or more electronics control units or ECUs) and a user interface 22. The user interface 22 may include a touchscreen, a speech recognition system, and/or various buttons for allowing a user to interact with features of the vehicle. The user interface 22 may be configured to interact with the user via visual communications (e.g., text and/or graphical displays), tactile communications or alerts (e.g., vibration), and/or audible communications.

The vehicle 10 also includes components of an end-to-end mobile vehicle communication system 30, which include a telematics unit 32 configured to communicate with an over-the-air communication network 34. The telematics unit 32 is configured to control transmitting and receiving wireless communications including voice and data communications, and communicate with the processing device 20.

In one embodiment, communications are transmitted wirelessly (e.g., via radio waves) to a wireless carrier system that includes one or more cellular towers 36, radio towers, or other communication relay systems. The communication network 34 may include services from one or more mobile telephone switching offices and wireless networks. The communication network 34 can be implemented to form a suitable system for connecting communication relay systems to the vehicle 10 via any suitable wireless interface and/or standard. Data can be communicated bi-directionally between a processing center 38 and the vehicle 10.

Figure 2:
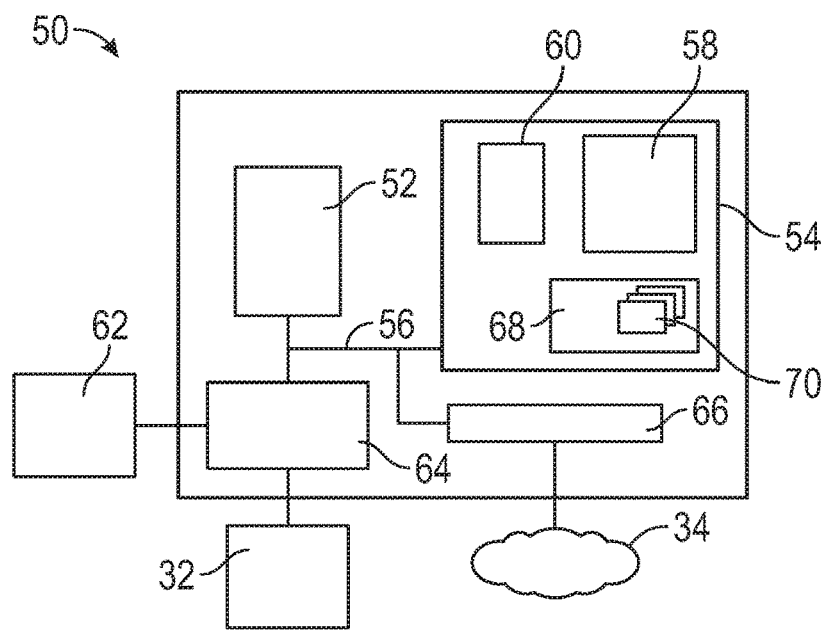
FIG. 2 depicts a computer system configured to perform aspects of wireless network communications, in accordance with an exemplary embodiment.

FIG. 2 illustrates aspects of an embodiment of a computer system 50 that is in communication with, or is part of, the communication system 30, and that can perform various aspects of embodiments described herein. The computer system 50 includes at least one processing device 52, which generally includes one or more processors for performing aspects of image acquisition and analysis methods described herein. The processing device 52 can be integrated into the vehicle 10, for example, as the on-board processor 24 and/or the telematics unit 32, or can be a processing device separate from the vehicle 10, such as a server, a personal computer or a mobile device (e.g., a smartphone or tablet). For example, the processing device 52 can be part of, or in communication with, one or more engine control units (ECU), one or more vehicle control modules, a cloud computing device, a vehicle satellite communication system and/or others. The processing device 52 may be configured to perform communication and time update methods described herein, and may also perform functions related to control of various vehicle subsystems.

Components of the computer system 50 include the processing device 52 (such as one or more processors or processing units), a system memory 54, and a bus 56 that couples various system components including the system memory 54 to the processing device 52. The system memory 54 may include a variety of computer system readable media. Such media can be any available media that is accessible by the processing device 52, and includes both volatile and non-volatile media, removable and non-removable media. For example, the system memory 54 includes a non-volatile memory 58 such as a hard drive, and may also include a volatile memory 60, such as random access memory (RAM) and/or cache memory.

The processing device 52 can also communicate with one or more external devices 62 such as a keyboard, a pointing device, and/or any devices (e.g., network card, modem, etc.) that enable the processing device 52 to communicate with one or more other computing devices. In addition, the processing device 52 can communicate with one or more devices such as the telematics unit 32. The processing device 52 can also communicate with other devices that may be used in conjunction with communication and time update methods, such as a Global Positioning System (GPS) device and vehicle control devices or systems (e.g., for driver assist and/or autonomous vehicle control). Communication with various devices can occur via Input/Output (I/O) interfaces 64.

The processing device 52 and/or the telematics unit 32 communicate with one or more networks such as the wireless network 34 via a network adapter 66. It should be understood that although not shown, other hardware and/or software components could be used in conjunction with the computer system 50. Examples include, but are not limited to: microcode, device drivers, redundant processing units, external disk drive arrays, RAID systems, and data archival storage systems, etc.

The system memory 54 can include at least one program product having a set (e.g., at least one) of program modules that are configured to carry out functions of the embodiments described herein. For example, the system memory 54 stores a program or program suite 68 including various program modules 70 that generally carry out the functions and/or methodologies of embodiments described herein, such as transmitting and receiving wireless communications, determining whether a condition exists that can result in a displayed time error, and updating local time information. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In some vehicle communication and/or telematics systems, there can be errors in the accuracy of the local time presented to drivers. For example, under some circumstances, a telematics system (e.g., OnStar®) used by a vehicle may not display the correct time when the vehicle is started (i.e., at ignition) following a change in daylight savings time. This is due to the communication protocols employed by wireless communication networks, which generally include protocols used in cellular communication and wireless broadband networks (e.g., LTE, 3GNR, 5G etc.). Such protocols and cellular network configurations can inhibit the transmission of a time change message, which provides a local time offset from a standard time (e.g., Coordinated Universal Time (UTC) as used, for example, by GPS systems).

The communication system 30 addresses the above issues and is configured to transmit a message to a wireless communication network that prompts or "forces" the network to return a message that includes local time information, such as a local time offset. The message is generated according to a communication protocol used by the network, and is configured to cause the wireless network to return a message that includes a time update (e.g., an updated local time offset).

As discussed further below, the communication system is triggered by a vehicle state or state transition to perform a method of communicating with a network and/or retrieving local time information. An example of a trigger is a change in the vehicle from an ignition OFF state to an ignition ON state.

Figure 3:
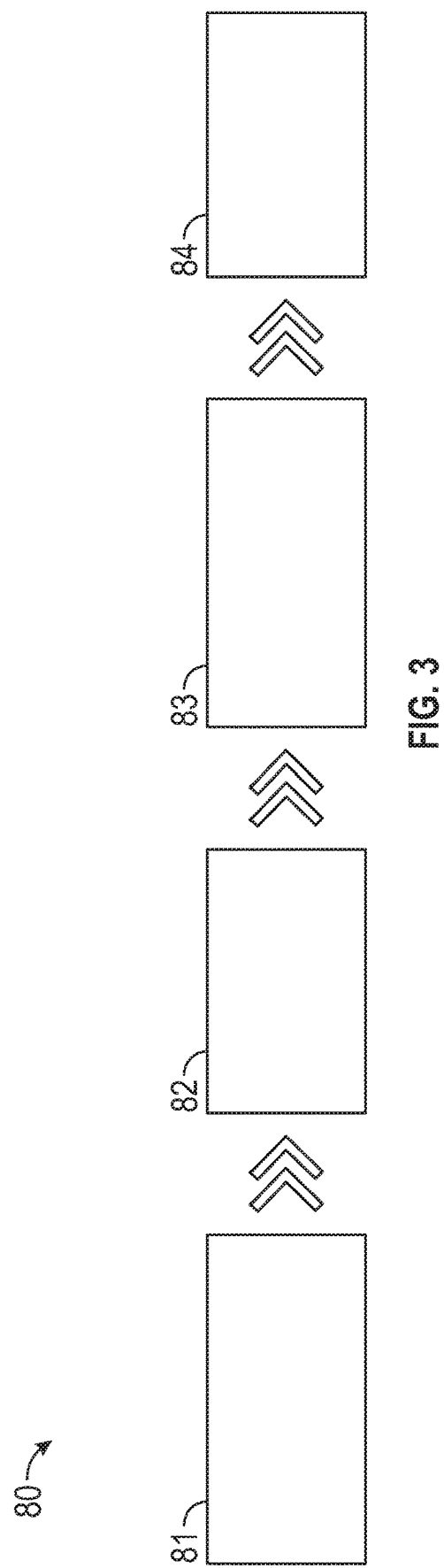
FIG. 3 is a flowchart depicting a method of communicating between a vehicle and a wireless network to update local time information, in accordance with an exemplary embodiment.

Referring to FIG. 3, the communication system 30 is configured to perform a method 80 that includes various stages or steps represented by blocks 81-84, in order to determine whether the time that is currently recorded by a vehicle system is potentially inaccurate and/or prompt a wireless network to provide a time update. The stages or steps can be performed sequentially. However, in some embodiments, one or more of the stages or steps can be performed in a different order than that shown or fewer than the stages or steps shown may be performed.

The method 80 is performed by a processing device, such as the processing device 20, the processing device 52 and/or the telematics unit 32. The processing device is configured to communicate with a wireless network via a communication protocol (e.g., a Long Term Evolution (LTE) standard). The method 80 is not so limited and can be performed by any suitable processing device or combination of processing devices.

At block 81, the processing device (e.g., the processing device 20) performs an assessment in response to detecting a vehicle state or state transition. An example of a vehicle state or state transition is a transition from an ignition OFF state to an ignition ON state.

The assessment includes determining whether a condition exists in which the local time currently stored and displayed by a vehicle (referred to herein as the "current time") may be inaccurate. For example, a condition exists when a time update message from the wireless network has not been received within a selected time period.

At block 82, the processing device attempts to read local time information (e.g., the local time offset) from network broadcast information. If successful, the processing device updates the vehicle clock if needed. For example, the processing device reads stored time data and determines whether a daylight savings time (DST) change occurred while the vehicle was in the ignition OFF state, and whether the stored time data reflects the DST time change.

At block 83, if the attempt is unsuccessful (e.g., the stored time data does not indicate that the time reflects the DST time change), the processing device performs a signaling procedure that forces the wireless network (i.e., requires the network according to the communication protocol) to send local time information to the vehicle. For example, the processing device generates and transmits a parameter change message, which tells the network that the processing device requests that a parameter defined by the communication protocol be changed.

Examples of a parameter change defined by the communications protocol may include, but are not limited to, a change in the processing device's specific DRX parameter, the processing device's network capability information, the processing device's voice domain preference, the processing device's radio capability, and/or the processing device's desire to use or cease use to extended DRX (eDRX) capabilities. In response, the network sends a return message according to the protocol that includes local time information including, for example, a local time offset value.

At block 84, the processing device receives the return message and updates the current time according to received local time information, as well as the displayed time (e.g., a radio clock display).

Figure 4:
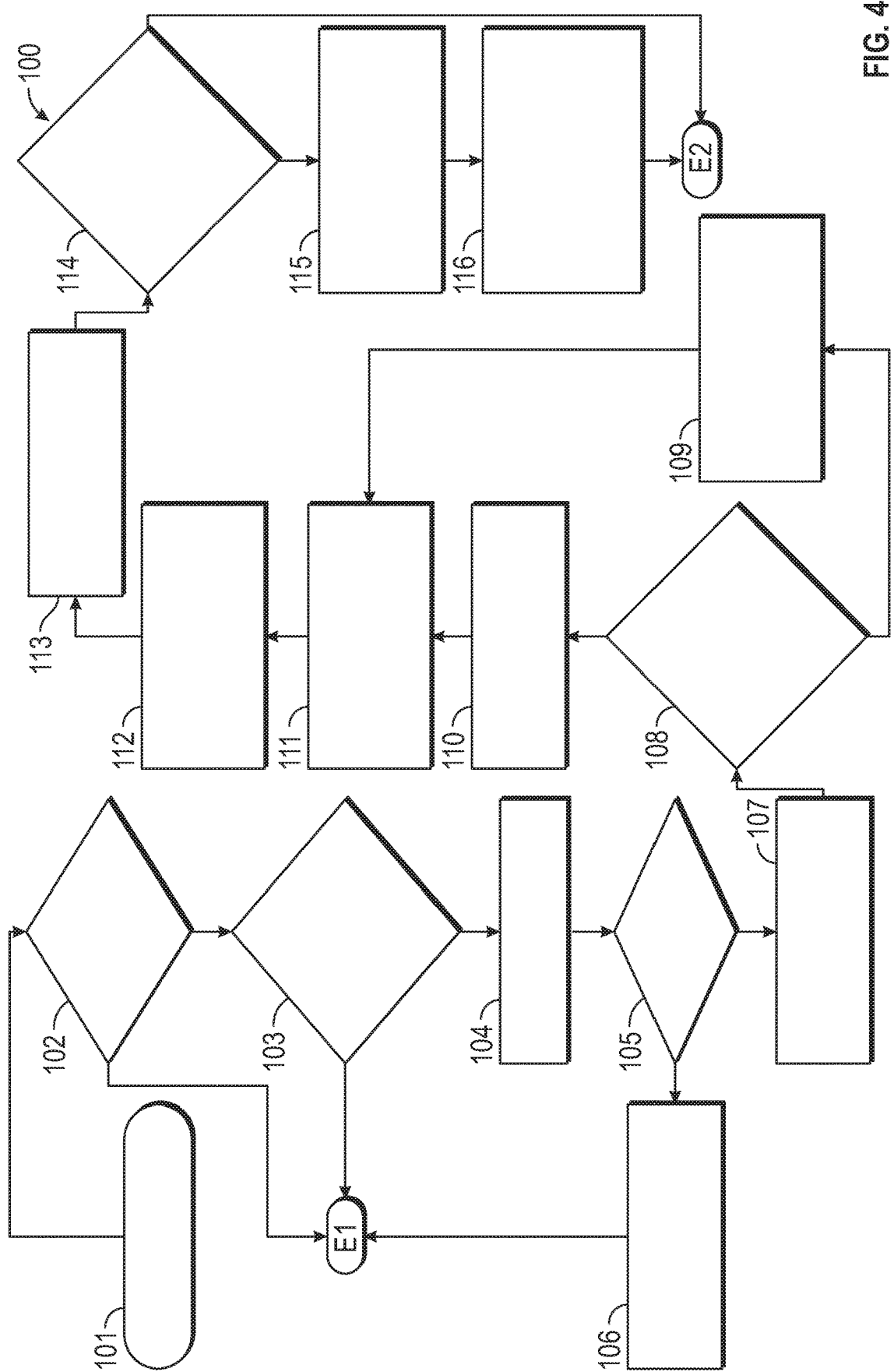
FIG. 4 is a flowchart depicting an example of the method of FIG. 3.

FIG. 4 illustrates embodiments of a computer-implemented method 100 of determining whether the time that is currently recorded by a vehicle system is potentially inaccurate and/or prompting a wireless network to provide a time update. The method 100 may be performed by a processor or processors disposed in a vehicle (e.g., as an ECU, telematics unit and/or on-board computer) and/or disposed in a device such as a smartphone, tablet or smartwatch. The method 100 includes a plurality of stages or steps represented by blocks 101-116, all of which can be performed sequentially. However, in some embodiments, one or more of the stages can be performed in a different order than that shown or fewer than the stages shown may be performed.

The method 100 is discussed in conjunction with the communication system 30 of FIGS. 1 and 2, for illustration purposes. It is noted that aspects of the method 100 may be performed by any suitable processing device or system.

The method 100 is also discussed in conjunction with an example of a wireless network, namely a wireless broadband network operated according to a protocol defined by a Long Term Evolution (LTE) standard (a LTE network). In this example, the telematics unit 32 (or other device connected to the wireless network) can be considered user equipment (UE) as defined by the LTE communications protocol. In LTE systems, the telematics unit 32 can perform a periodic update or registration procedure, by which updated time information can be acquired by the telematics unit.

It is noted that embodiments described herein can be applied to any suitable wireless network and is not limited to the examples discussed herein. Other examples of wireless networks that could be used include 3G systems, such as General Packet Radio Service (GPRS) systems, $3^{rd}$ generation Partnership Project (3GPP) systems and 3G New Radio (NR) systems. Further examples include 5G systems such as 5G NR systems.

In this example, the vehicle state that triggers the assessment is a state transition from ignition OFF to ignition ON. As discussed further, aspects of the method 100 are performed in response to detecting a vehicle condition in which the device and network configuration is such that an undetected local time change event may have occurred during ignition OFF state. The condition that causes the telematics unit to transmit a parameter change message, in the example discussed below, is that the processing device and the wireless network are configured for voice over LTE using IP Multimedia Subsystem (IMS) operation, and that a timer maintained by the processing device has a period that is greater than a registration period.

At block 101, a driver starts the vehicle 10 and a processing device in the vehicle 10 and the communication system 30 system detects that the vehicle ignition has entered an ON state. In response, at block 102, the processing device determines whether the processing device (e.g., included in or connected to the telematics unit 32) is provisioned for IMS operation. As part of LTE protocols, IMS provisioned units initiate a periodic registration procedure, during which a telematics unit timer is reset.

If the local time has changed while the vehicle was off, the telematics unit may not be informed of the time change until the next periodic registration, which can result in an inaccurate time display. The local time change may occur due to various reasons, such as the vehicle entering a different time zone, or a daylight savings time (DST) change.

At blocks 102 and 103, the processing device determines whether conditions exist that could result in the time change being undetected by the vehicle 10. For example, the processing device determines whether the processing device and/or telematics unit is provisioned for IMS operation. If not, the method ends at block E1.

At block 103, if the processing device and/or the telematics unit is provisioned for IMS, it is determined whether a periodic registration period is greater than a IMS registration period. For example, the processing device and/or the telematics unit determines whether a period of a T3412 timer (e.g., 54 minutes) is greater than the IMS registration period. The T3412 timer is a timer used in update procedures, referred to as Periodic Tracking Area Update (TAU) procedures.

At block 104, if the condition at block 103 is satisfied (e.g., the T3412 timer period is greater than the IMS registration period), the processing device and/or telematics unit determines whether a timer update has been broadcast from the network. For example, the processing device commands the telematics unit to inspect a time record (e.g., a system information block 16 (SIB16)) to determine whether the network has sent an update based on the DST change. At block 105, the telematics unit reads the SIB16 block. The SIB16 block includes local time information, including the local time offset and an indication as to whether DST has been applied to the local time offset.

If the read is successful (e.g., the SIB16 block) indicates that DST has been applied), at block 106, the processing device and/or telematics unit updates the vehicle local time (the current time) based on a local time offset value. The local time offset is a difference between local time and the UTC time reference.

If the read is unsuccessful (e.g., the SIB16 block does not indicate that DST has been applied), the processing device and/or telematics unit selects a configuration parameter associated with the telematics unit and sends a message to the network indicating a parameter change. This message prompts the network to transmit a return message that includes a time update. An example of a parameter is the configured Discontinuous Reception (DRX) period. The parameter change in this example is a change in the value of the DRX time period.

For example, at block 107, the telematics unit determines the current or default DRX period. AT block 108, the telematics unit determines whether the DRX period is at a default value. If the DRX period is at the default value, the telematics unit sets the DRX period to a different value (block 109). If the DRX period is not at the default value, the telematics unit sets the DRX period to the default value (block 110).

At block 111, the telematics unit performs an update procedure, during which the telematics unit transmits a parameter change message to the network, which indicates a desired change to the DRX period. For example, the telematics unit performs a Parameter Change Tracking Area Update (TAU) procedure with the network. A "procedure" generally refers to process by which the vehicle 10 and the network 30 communicate to accomplish some function, which in this example is a notification to the network that the vehicle is changing some parameter within the LTE communication protocol.

At block 112, the network transmits a return message including local time information in response to the update procedure. For example, the network provides a local time offset value via an Evolved Packet System (EPS) Mobility Management (EMM) information message including the local time offset. The telematics unit then updates the current time based on the offset (block 113).

After the time update, the parameter may be set back to the value that it had prior to the method 110. For example, at block 114, the processing device determines whether the telematics unit has a default DRX period value. If so, the method ends at block E2. If not, the telematics unit is set back to the default value (block 115). The telematics unit then performs the update again with the network (block 116).

Figure 5:
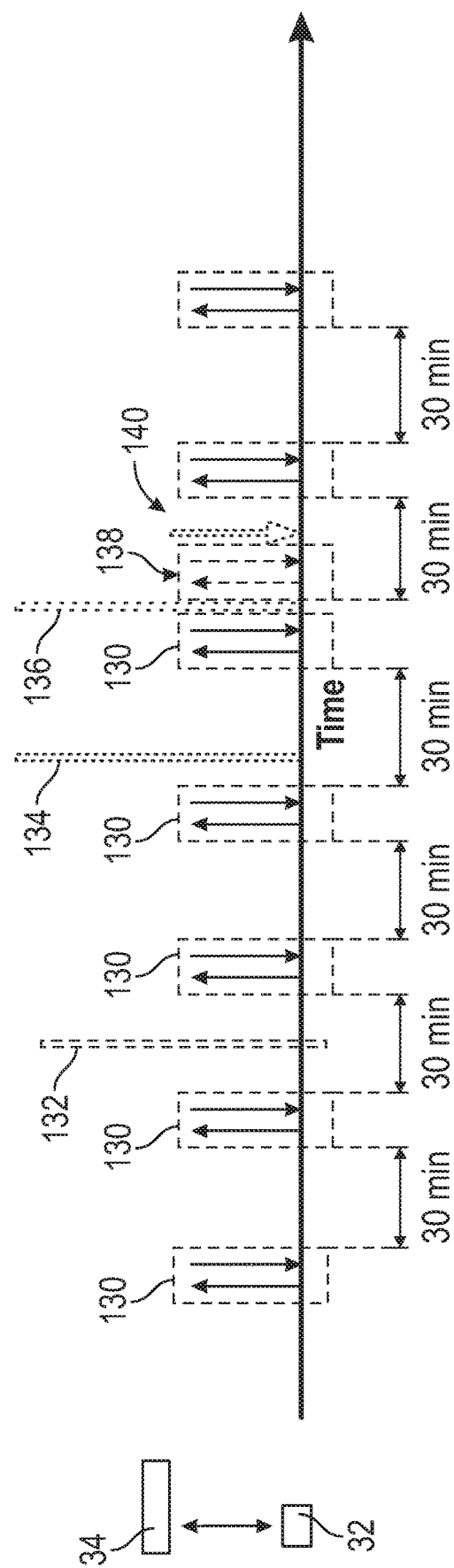
FIG. 5 depicts an example of communication between a vehicle and a wireless broadband network, according to the prior art.

FIG. 5 depicts examples of a prior art signaling sequence used by a vehicle system in communication with a LTE network. The signaling sequence is illustrated with reference to a time axis or time line T. This example depicts an instance in which the LTE communication protocol results in a delay in the update of vehicle time as a result of a daylight savings time (DST) time change.

FIG. 5 shows an example for a vehicle processing device that is provisioned with IMS capability. When the vehicle ignition is OFF, a vehicle processing device periodically initiates an IMS registration procedure depicted by arrow sequences 130. As part of each IMS registration 130, the vehicle's timer (e.g., the Periodic Tracking Area Update Timer or T3412) is reset. In this example, the IMS registration 30 is performed every 30 minutes (i.e., has a period of 30 minutes), and the T3412 timer has a period of 54 minutes.

While the vehicle ignition is in the OFF state, a DST change event occurs at a time depicted by line 132. After the vehicle ignition is turned ON at a time depicted by line 134, the IMS registration procedures continue to be performed periodically. As the vehicle travels, if it crosses a tracking area boundary (defined by the network) at a time shown by line 136, the network and the vehicle perform a normal TAU procedure 138 based on crossing the boundary. The normal TAU procedure 138 causes the network to transmit a EMM message 140 with a local time offset value.

As shown, if a DST time change at time 132 occurs prior to the vehicle crossing a boundary, there is no triggering mechanism at ignition to trigger a time update. As such, the vehicle will not be updated in a timely manner, resulting in the vehicle time clock being incorrect until the vehicle crosses a boundary.

Figure 6:
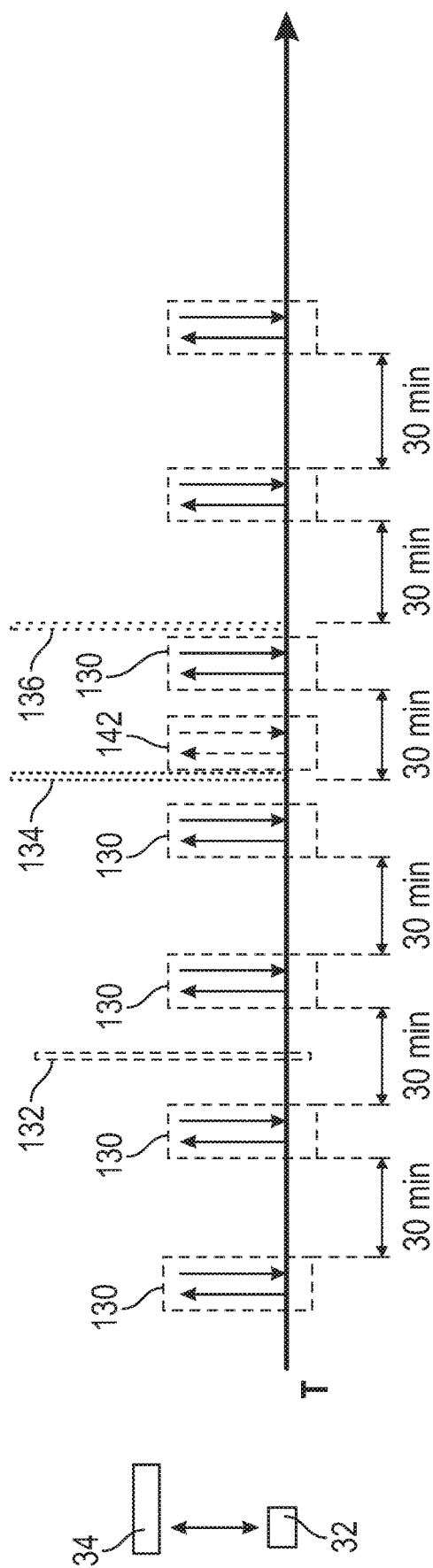
FIG. 6 depicts an example of communication between the vehicle and the network of FIG. 5, in accordance with an exemplary embodiment.

FIG. 6 depicts an example of how the embodiments described herein address the issue illustrated in FIG. 5. In this example, the method 100 is performed upon ignition, and a processing device such as the processing device 20 and/or 52 initiates a parameter change procedure 142, which includes a parameter change as discussed above and transmission of a parameter change message that prompts the network to transmit a EMM message or other suitable message that includes the local time offset. Accordingly, the method 100 results in a timely update of the vehicle clock upon a DST change and greatly reduces or eliminates the time lag depicted in FIG. 6.

Embodiments described herein thus provide for a device or unit-based solution to delays in local time updates, by prompting the network to provide updated time information immediately upon the vehicle ignition being turned on, so as to eliminate the delay. One advantage of such a device or unit-based approach avoids the time and cost that would otherwise be needed to implement a network-based solution.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system for updating vehicle time information, comprising:
 a communication device configured to wirelessly communicate with a wireless network using a network communication protocol; and
 a processing unit configured to perform:
 assessing communications between the communication device in a vehicle and the wireless network to determine whether a condition related to a potential local time offset error exists;
 based on determining that the condition exists, transmitting a message supported by the communication protocol to the wireless network, the message requesting a change in a communication parameter associated with the communication device as defined by the communication protocol, the change in the communication parameter configured to prompt the wireless network to return a response message including a local time offset; and
 updating a vehicle local time record based on the local time offset.

2. The system of claim 1, wherein the wireless communication network is a wireless broadband network.

3. The system of claim 1, wherein the processing unit is configured to assess the communications based on a change of a vehicle state.

4. The system of claim 3, wherein the change in the vehicle state includes a change from an ignition OFF state to an ignition ON state.

5. The system of claim 3, wherein the change in the vehicle state includes a transition between a first time zone and a second time zone.

6. The system of claim 1, wherein the condition includes a daylight savings time (DST) local time change occurring subsequent to a previous time update received by the communication device from the wireless network.

7. The system of claim 1, wherein the wireless network is a Long Term Evolution (LTE) network, and the communication parameter is a discontinuous reception cycle (DRX) period.

8. The system of claim 1, wherein the communication device is a telematics unit disposed in the vehicle.

9. A method of updating vehicle time information, comprising:

assessing communications between a communication device in a vehicle and a wireless network using a network communication protocol, wherein the assessing includes determining whether a condition related to a potential local time offset error exists;

based on determining that the condition exists, transmitting a message supported by the communication protocol to the wireless network, the message requesting a change in a communication parameter associated with the communication device as defined by the communication protocol, the change in the communication parameter configured to prompt the wireless network to return a response message including a local time offset; and updating a vehicle local time record based on the local time offset.

10. The method of claim 9, wherein the wireless communication network is a wireless broadband network.

11. The method of claim 9, wherein the assessing is performed based on a change of a vehicle state.

12. The method of claim 9, wherein the condition includes a daylight savings time (DST) local time change occurring subsequent to a previous time update received by the communication device from the wireless network.

13. The method of claim 9, wherein the wireless network is a Long Term Evolution (LTE) network, and the communication parameter is a discontinuous reception cycle (DRX) period.

14. The method of claim 9, wherein the communication device is a telematics unit disposed in the vehicle.

15. A vehicle system comprising:
a memory having computer readable instructions; and
a processing device for executing the computer readable instructions, the computer readable instructions controlling the processing device to cause the processing device to perform:

assessing communications between a communication device in a vehicle and a wireless network using a network communication protocol, wherein the assessing includes determining whether a condition related to a potential local time offset error exists;

based on determining that the condition exists, transmitting a message supported by the communication protocol to the wireless network, the message requesting a change in a communication parameter associated with the communication device as defined by the communication protocol, the change in the communication parameter configured to prompt the wireless network to return a response message including a local time offset; and updating a vehicle local time record based on the local time offset.

16. The vehicle system of claim 15, wherein the assessing is performed based on a change of a vehicle state, the change in the vehicle state including a change from an ignition OFF state to an ignition ON state.

17. The vehicle system of claim 15, wherein the condition includes a daylight savings time (DST) local time change occurring subsequent to a previous time update received by the communication device from the wireless network.

18. The vehicle system of claim 15, wherein the wireless network is a Long Term Evolution (LTE) network, and the communication parameter is defined by a LTE protocol.

* * * * *